US008525641B2

(12) United States Patent
Yamane et al.

(10) Patent No.: US 8,525,641 B2
(45) Date of Patent: Sep. 3, 2013

(54) VEHICULAR ELECTRONIC KEY SYSTEM

(75) Inventors: Katsuyasu Yamane, Wako (JP); Shinichi Ueda, Wako (JP); Shinichi Arie, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 13/242,870

(22) Filed: Sep. 23, 2011

(65) Prior Publication Data

US 2012/0092128 A1 Apr. 19, 2012

(30) Foreign Application Priority Data

Oct. 19, 2010 (JP) ................................ 2010-234872

(51) Int. Cl.
*G05B 19/00* (2006.01)

(52) U.S. Cl.
USPC ........ 340/5.64; 340/5.61; 340/5.65; 340/5.72

(58) Field of Classification Search
USPC ............. 340/5.6, 5.61, 5.62, 5.63, 5.64, 5.65, 340/5.66, 5.7, 5.71, 5.72, 425.5, 426.1, 426.13, 340/426.17
See application file for complete search history.

(56) References Cited

U.S. PATENT DOCUMENTS

2004/0124969 A1* 7/2004 Okada .......................... 340/5.72
2005/0190039 A1* 9/2005 Aoyama et al. .............. 340/5.21

FOREIGN PATENT DOCUMENTS

JP 2006-225976 8/2006
JP 2008-56145 3/2008
JP 2009-287275 12/2009
JP 2010-23548 2/2010

OTHER PUBLICATIONS

Japanese Office Action for corresponding JP Application No. 2010-234872, Aug. 28, 2012.

* cited by examiner

*Primary Examiner* — Nabil Syed
(74) *Attorney, Agent, or Firm* — Ditthavong Mori & Steiner, P.C.

(57) ABSTRACT

A vehicular electronic key system includes a vehicle having a key cylinder and a portable device. The portable devise includes a key body and a mechanical key. The key body is communicatable with the vehicle. The mechanical key is attachable to and detachable from the key body and mechanically rotates the key cylinder whereby the communication between the vehicle and the portable device allows the vehicle to execute predetermined functions. The key body includes a key detector configured to detect an attachment state and a detachment state of the mechanical key to and from the key body so that the key body transitions to a valet mode to limit some of the predetermined functions executable by the vehicle in accordance with the communication between the vehicle and the portable device while the key detector detects the detachment state of the mechanical key from the key body.

4 Claims, 4 Drawing Sheets

VEHICULAR ELECTRONIC KEY SYSTEM

CROSS-REFERENCE TO RELATED APPLICATIONS

The present application claims priority under 35 U.S.C. §119 to Japanese Patent Application No. 2010-234872, filed Oct. 19, 2010. The contents of this application are incorporated herein by reference in their entirety.

BACKGROUND OF THE INVENTION

1. Field of the Invention

The present invention relates to a vehicular electronic key system.

2. Discussion of the Background

There is a known method that allows the owner of a vehicle to set, in an electronic key (so-called "smart key"), a mode in which specific functions of the vehicle are limited, these functions being permitted with use of the electronic key (so-called "valet mode") and provide a person other than the vehicle's owner with the electronic key when this person drives the vehicle.

There is a system improves such system (e.g., see Japanese Unexamined Patent Application Publication No. 2006-225976). According to this system, for example, an electronic key includes a portable unit (key body), a mechanical key and a tongue, and transmits a state signal indicative of the attachment/detachment state of the tongue to/from the key body to a vehicle, and an on-vehicle control unit sets a valet mode when the state signal received from the electronic key indicates detachment of the tongue.

Since the owner of the vehicle entrusts another person with the key body having only the tongue removed from the electronic key and the mechanical key in the system according to the related art, this person can unlock doors and start the engine with the mechanical key even when the battery of the key body is dead.

SUMMARY OF THE INVENTION

According to one aspect of the present invention, a vehicular electronic key system includes a vehicle having a key cylinder and a portable device. The portable devise includes a key body and a mechanical key. The key body is communicatable with the vehicle. The mechanical key is attachable to and detachable from the key body and mechanically rotates the key cylinder whereby the communication between the vehicle and the portable device allows the vehicle to execute predetermined functions. The key body includes a key detector configured to detect an attachment state and a detachment state of the mechanical key to and from the key body so that the key body transitions to a valet mode to limit some of the predetermined functions executable by the vehicle in accordance with the communication between the vehicle and the portable device while the key detector detects the detachment state of the mechanical key from the key body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
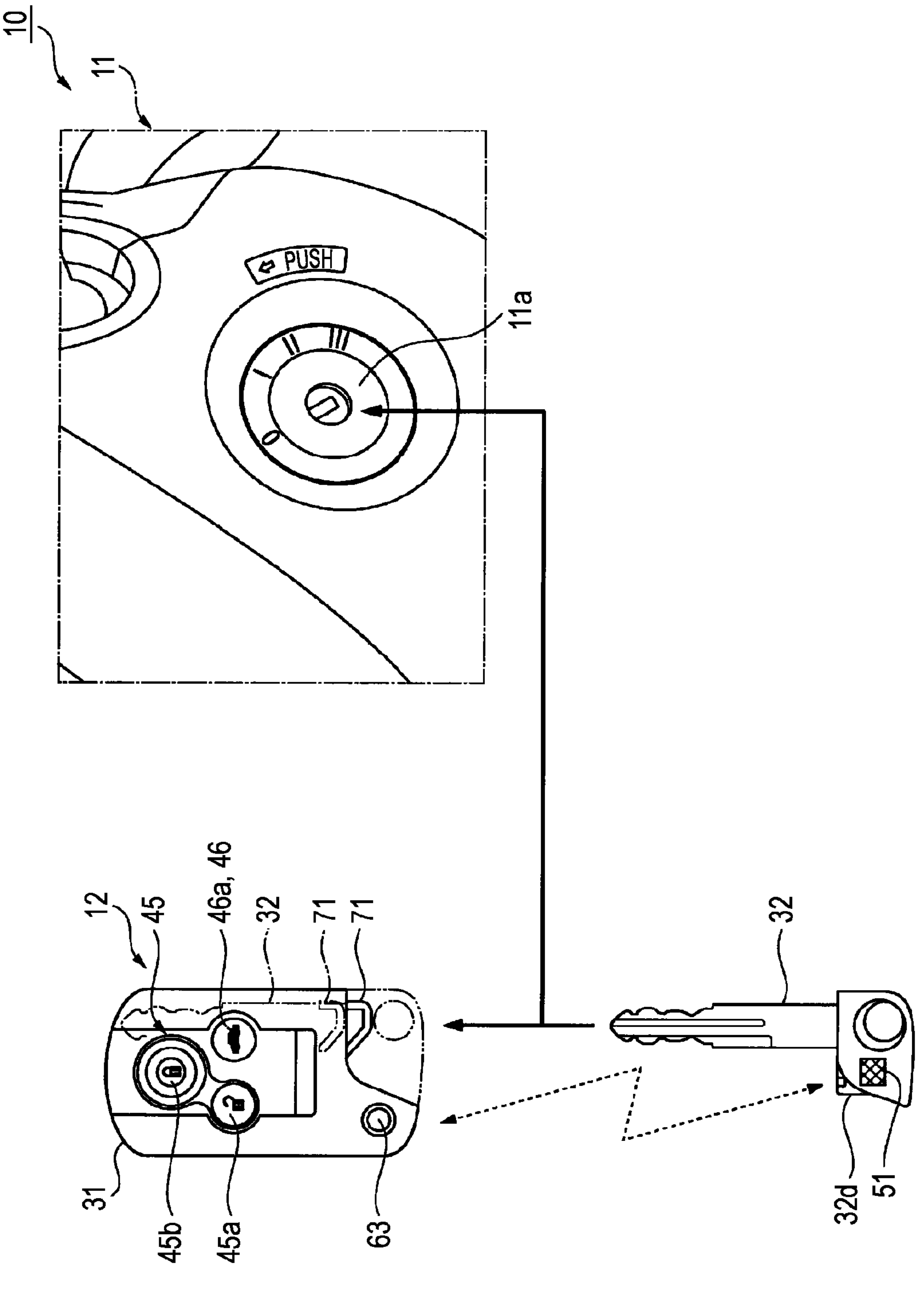
FIG. 1 is a diagram showing a key body and a mechanical key of an vehicular electronic key system according to an exemplary embodiment of the invention.

The embodiments will now be described with reference to the accompanying drawings, wherein like reference numerals designate corresponding or identical elements throughout the various drawings.

Figure 2:
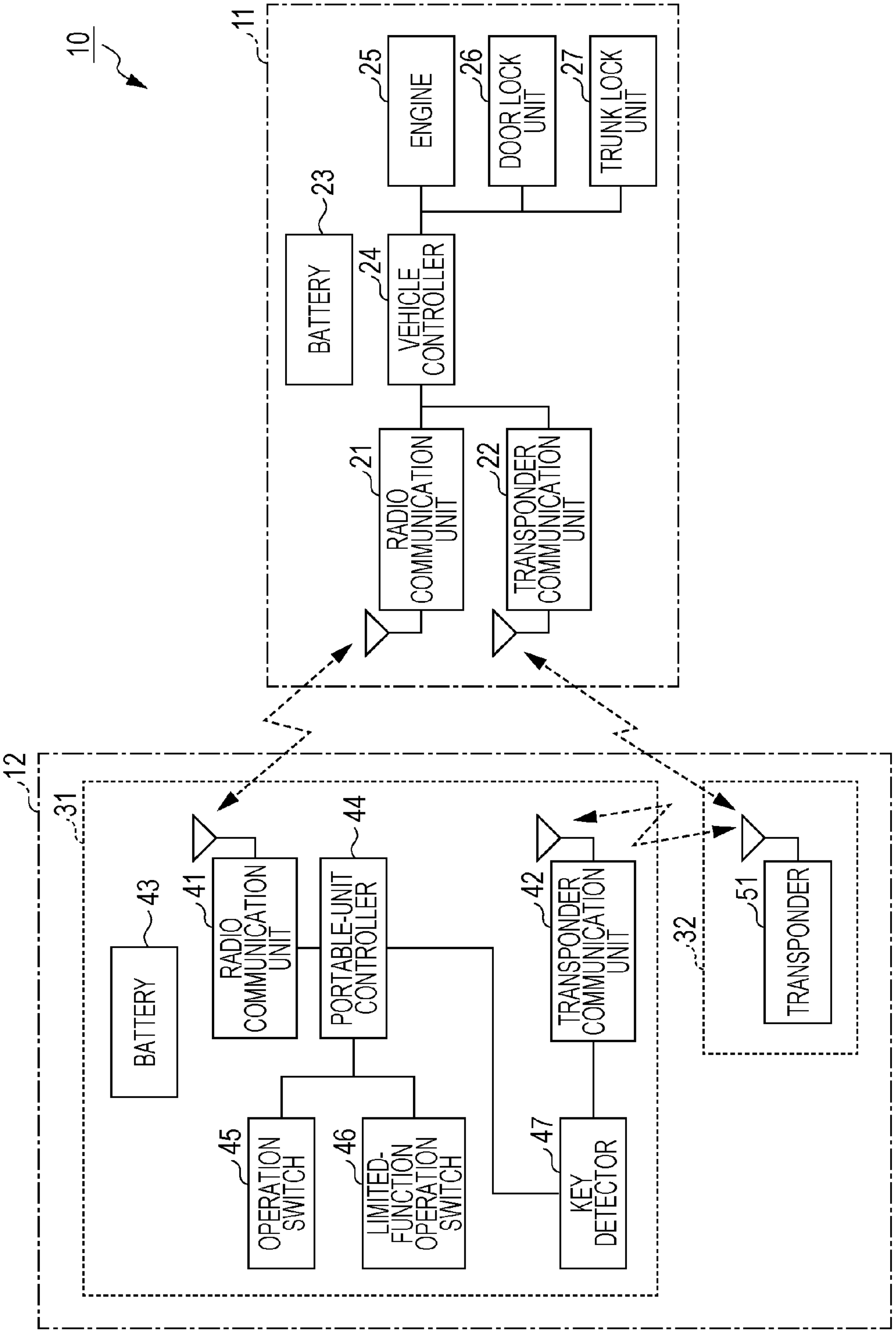
FIG. 2 is a structural diagram of the vehicular electronic key system according to the embodiment of the invention.

As shown in FIGS. 1 and 2, for example, the vehicular electronic key system 10 according to the embodiment includes a vehicle 11 having a key cylinder 11*a*, and a portable unit 12 that can communicate with the vehicle 11. The vehicular electronic key system 10 is configured in such a way that in accordance with the communication with the portable unit 12, the vehicle 11 executes predetermined functions.

The vehicle 11 includes, for example, a radio communication unit 21, a transponder communication unit 22, a battery 23 which is a power supply for various on-vehicle devices, a vehicle controller 24, an internal combustion engine (hereinafter simply called "engine") 25, a door lock unit 26, and a trunk lock unit 27.

The radio communication unit 21 of the vehicle 11 receives an RF (Radio Frequency) signal transmitted from, for example, the portable unit 12, and transmits an LF (Low Frequency) signal to the portable unit 12 from an LF antenna (not shown) under the control of the vehicle controller 24.

Examples of the LF signals transmitted from the vehicle 11 include a request signal which is intermittently transmitted to the portable unit 12, a signal representing a reception result when the radio communication unit 21 receives a command signal transmitted from the portable unit 12 (e.g., the reception result being the intensity or the like of a received command signal), and a signal representing whether operations of on-vehicle devices (e.g., driving of the door lock unit 26 and the trunk lock unit 27) instructed by the command signal transmitted from the portable unit 12 are to be executed.

The transponder communication unit 22 supplies power to a transponder 51 of a mechanical key 32 of the portable unit 12 through electromagnetic induction to communicate with the transponder 51. When an identification code included in a unique signal received from the mechanical key 32 through the communication matches an identification code stored in advance, the transponder communication unit 22 outputs a signal permitting activation of the engine 25 to the vehicle controller 24.

The vehicle controller 24 includes a CPU (Central Processing Unit) which controls the vehicle 11 and various on-vehicle devices mounted therein.

The vehicle controller 24 instructs the radio communication unit 21 to intermittently transmit a request signal carried by the LF signal to the portable unit 12. When the radio communication unit 21 receives a response signal to the request signal from the portable unit 12, the vehicle controller 24 compares the identification code included in the response signal with an identification code stored in advance. When the received identification code matches the stored identification code, the vehicle controller 24 permits execution of operations of various on-vehicle devices whose execution is instructed by a command signal or a limited-function command signal transmitted from the portable unit 12.

In accordance with the command signal or limited-function command signal carried by the RF signal received by the radio communication unit 21 from the portable unit 12 through communication between the vehicle 11 and the portable unit 12, the vehicle controller 24 controls execution of the operations of various on-vehicle devices whose execution is instructed by the command signal or the limited-function command signal.

Examples of the operations of on-vehicle devices which are instructed by the command signal carried by the RF signal transmitted from the portable unit 12 include the activation or deactivation of the engine 25, and unlocking or locking of vehicle's doors (not shown) achieved by driving the door lock unit 26.

Examples of the operations of on-vehicle devices which are instructed by the limited-function command signal carried by the RF signal transmitted from the portable unit 12 include the unlocking of a trunk (not shown) achieved by driving the trunk lock unit 27.

When the signal carried by the RF signal received by the radio communication unit 21 from the portable unit 12 through communication between the vehicle 11 and the portable unit 12 indicates that a control mode is the valet mode, the vehicle controller 24 limits some of predetermined functions of the vehicle 11 (i.e., the operations of the on-vehicle devices that are instructed by the limited-function command signal) to control execution of the predetermined functions of the vehicle 11.

When the signal carried by the RF signal received by the radio communication unit 21 from the portable unit 12 through communication between the vehicle 11 and the portable unit 12 indicates inhibition of transition to the valet mode, the vehicle controller 24 inhibits the transition to the valet mode, and permits execution of some of predetermined functions of the vehicle 11 (i.e., the operations of the on-vehicle devices that are instructed by the limited-function command signal).

In addition, the vehicle controller 24 controls activation of the engine 25 according to a signal output from the transponder communication unit 22 (i.e., signal which permits activation of the engine 25) through communication between the vehicle 11 and the transponder 51 of the mechanical key 32 of the portable unit 12.

The door lock unit 26 includes a sensor (not shown) which detects direct contact of an operator carrying the key body 31 of the portable unit 12 with the handle (not shown) of a vehicle's door or the like. A signal showing the detection result output from the sensor is input to the vehicle controller 24.

The trunk lock unit 27 likewise includes a sensor (not shown) which detects direct contact of an operator carrying the key body 31 of the portable unit 12 with the handle (not shown) of the trunk or the like. A signal showing the detection result output from this sensor is input to the vehicle controller 24.

Upon reception of the signal representing direct contact of the operator carrying the key body 31 of the portable unit 12 from the door lock unit 26 or the trunk lock unit 27, the vehicle controller 24 instructs the radio communication unit 21 to transmit this signal to the portable unit 12 together with the request signal which is intermittently transmitted to the portable unit 12.

When the radio communication unit 21 receives a normal response signal to the request signal from the portable unit 12, the vehicle controller 24 permits a predetermined function of the vehicle 11 associated with the direct contact of the operator, i.e., permits the vehicle's doors to be unlocked or locked by driving of the door lock unit 26, or the trunk to be unlocked or locked by driving of the trunk lock unit 27. When the radio communication unit 21 does not receive the normal response signal to the request signal from the portable unit 12, on the other hand (i.e., when the portable unit 12 has not transmitted the response signal), the vehicle controller 24 limits a predetermined function of the vehicle 11 associated with the direct contact of the operator, i.e., the function of the vehicle 11 which is limited in the valet mode. Specifically, the vehicle controller 24 limits (e.g., inhibits) unlocking of the trunk which is achieved by driving of the trunk lock unit 27.

The door lock unit 26 and the trunk lock unit 27 both include switches (not shown) for instructing control of unlocking and locking of the vehicle's doors and the trunk, respectively. Signals output from the sensors are input to the vehicle controller 24.

Upon receiving a signal instructing control of unlocking and locking of the vehicle's doors or the trunk from the door lock unit 26 or the trunk lock unit 27, the vehicle controller 24 instructs the radio communication unit 21 to transmit this signal to the portable unit 12 together with the request signal to be intermittently transmitted toward the portable unit 12.

Upon receiving a signal representing the fact that the control mode has been changed from the normal mode to the valet mode from the portable unit 12 together with a normal response signal to the request signal, the vehicle controller 24 limits (e.g., inhibits) some of predetermined functions of the vehicle 11, namely, unlocking of the trunk achieved by driving of the trunk lock unit 27, and permits unlocking of the vehicle's doors achieved by the door lock unit 26.

The portable unit 12 includes the key body 31 and the mechanical key 32 which is attachable to and detachable from the key body 31 and mechanically rotates the key cylinder 11*a* of the vehicle 11.

The key body 31 includes, for example, a radio communication unit 41, a transponder communication unit 42, a battery 43 which is a power supply for the key body 31, a portable-unit controller 44, an operation switch 45, a limited-function operation switch 46, and a key detector 47.

The radio communication unit 41 of the portable unit 12 receives, for example, an LF signal transmitted from the vehicle 11 via an LF antenna (not shown), and transmits an RF signal to the vehicle 11 via an RF antenna (not shown) under the control of the portable-unit controller 44 according to a predetermined operation or the like performed on the portable unit 12.

The LF antenna of the portable unit 12 includes, three LF antennae which are disposed in parallel to three axes orthogonal to one another and have directivity.

Examples of the RF signal transmitted from the portable unit 12 include a response signal to a request signal transmitted from the vehicle 11, a command signal or limited-function command signal indicating execution of operations of various on-vehicle devices of the vehicle 11, a signal indicating that the control mode is either the normal mode or the valet mode, and a signal indicating that transition of the control mode from the normal mode to the valet mode is inhibited.

Predetermined operations performed on the portable unit 12 include, for example, a normal operation performed on the operation switch 45 or the limited-function operation switch 46, and an operation in a predetermined operation pattern different from the normal operation performed on the operation switch 45 or the limited-function operation switch 46.

The transponder communication unit 42 supplies power to the transponder 51 of the mechanical key 32 attached to the key body 31 by electromagnetic induction to communicate with the transponder 51, and outputs a signal representing the communication result (e.g., result of reception of a unique signal from the mechanical key) to the key detector 47.

The portable-unit controller 44 is configured to include a CPU which controls the key body 31.

When the radio communication unit 41 receives a request signal carried by the LF signal transmitted from the vehicle 11, the portable-unit controller 44 determines whether this request signal is a normal request signal. Upon determining that the request signal is a normal request signal, the portable-unit controller 44 instructs the radio communication unit 41 to transmit a response signal carried by the RF signal that has a unique identification code with respect to the request signal to the vehicle 11 if the control mode is the normal mode.

When the control mode is the valet mode, the portable-unit controller 44 determines whether the request signal includes a signal associated with some of predetermined functions of the vehicle 11 which are limited in the valet mode, e.g., a signal representing direct contact of the operator carrying the key body 31 of the portable unit 12 with the handle of the trunk. When the result of the determination is "YES", the portable-unit controller 44 instructs the radio communication unit 41 to inhibit transmission of the response signal to the vehicle 11. When the result of the determination is "NO", on the other hand, the portable-unit controller 44 instructs the radio communication unit 41 to transmit the response signal to the vehicle 11.

Then, in accordance with the operator's operation performed on the operation switch 45 or the limited-function operation switch 46, a signal output from the key detector 47, etc., the portable-unit controller 44 controls the radio communication unit 41 to transmit a command signal or a limited-function command signal instructing execution of the operations of various on-vehicle devices of the vehicle 11.

The operation switch 45 is configured to include an unlock button 45*a* for instructing unlocking of the vehicle's doors achieved by driving of the door lock unit 26, and a lock button 45*b* for instructing locking of the vehicle's doors achieved by driving of the door lock unit 26.

The limited-function operation switch 46 is configured to include a trunk unlock button 46*a* for instructing unlocking of the trunk achieved by driving of the trunk lock unit 27.

In accordance with the operator's operation of the operation switch 45 or the limited-function operation switch 46, for example, the portable-unit controller 44 instructs the radio communication unit 41 to transmit a command signal or a limited-function command signal instructing execution of predetermined functions of the vehicle 11 to the vehicle 11 as the operations of various on-vehicle devices of the vehicle 11.

Examples of the predetermined functions of the vehicle 11 as the operations of various on-vehicle devices of the vehicle 11 include activation or deactivation of the engine 25, unlocking or locking of the vehicle's doors (not shown) achieved by the door lock unit 26, and unlocking or locking of the trunk (not shown) achieved by the trunk lock unit 27.

While detachment of the mechanical key 32 from the key body 31 is detected by the key detector 47 to be discussed later, the portable-unit controller 44 changes the control mode to the valet mode to limit some of predetermined functions of the vehicle 11 according to the command signal or the limited-function command signal (i.e., functions according to the limited-function command signal).

When a response signal to a request signal carried by the LF signal intermittently transmitted from the vehicle 11 is transmitted to the vehicle 11 from the portable unit 12, the portable-unit controller 44 instructs the radio communication unit 41 to transmit the signal indicating that the control mode has been changed to valet mode from the normal mode to the vehicle 11.

In the valet mode, the portable-unit controller 44 permits transmission of a command signal corresponding to the operator's normal operation of the operation switch 45 to the vehicle 11, and inhibits transmission of a limited-function command signal corresponding to the operator's normal operation of the limited-function operation switch 46 to the vehicle 11.

That is, some of the predetermined functions of the vehicle 11 which are limited in the valet mode include unlocking of the trunk achieved by driving of the trunk lock unit 27.

When an operation in a predetermined operation pattern different from the normal operation on the operation switch 45 or the limited-function operation switch 46 is performed while attachment of the mechanical key 32 to the key body 31 is detected by the key detector 47 to be discussed later, for example, the portable-unit controller 44 inhibits transition to the valet mode thereafter.

When a response signal to the request signal carried by the LF signal intermittently transmitted from the vehicle 11 is transmitted to the vehicle 11 from the portable unit 12, the portable-unit controller 44 instructs the radio communication unit 41 to transmit a signal indicating inhibition of the transition to the valet mode to the vehicle 11.

When the radio communication unit 41 receives a signal transmitted from the vehicle 11 according to the command signal or limited-function command signal transmitted from the portable unit 12 (e.g., signal instructing execution of operations of on-vehicle devices which are instructed by the command signal or limited-function command signal), for example, the portable-unit controller 44 informs the operator of the reception through an answer-back operation of driving a portable-unit indicator (not shown) constituted by, for example, a light emitter, or a speaker (not shown).

In addition, in response to a signal output from a displaceable member 61 to be discussed later by the displacement of the displaceable member 61, or a signal representing the result of detection from a sensor 62 which detects an electromagnetic change to be discussed later, or a signal output from a release button 63 to be discussed later, the portable-unit controller 44 drives the transponder communication unit 42 to supply electromagnetically induced power to the transponder 51 of the mechanical key 32 from the transponder communication unit 42 to execute communication with the transponder 51.

The key detector 47 detects the attachment state and the detachment state of the mechanical key 32 to and from the key body 31.

The key detector 47 detects the attachment state or the detachment state of the mechanical key 32 to and from the key body 31 based on, for example, the result of communication with the transponder 51 of the mechanical key 32 output from the transponder communication unit 42.

The displaceable member 61 is displaced when it has physical contact with the mechanical key 32 according to the attachment or detachment of the mechanical key 32 to or from the key body 31, and includes a signal output section 61*a*, such as a switch, which outputs a signal according to predetermined displacement.

Figure 3A:
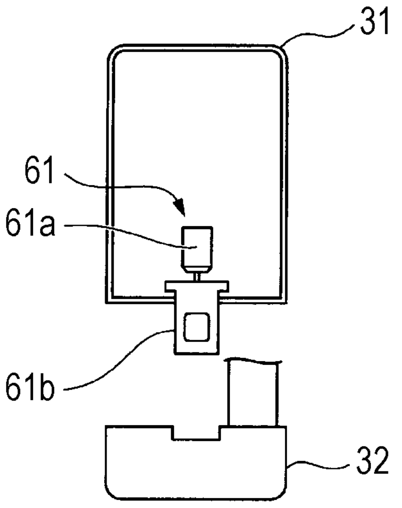
FIGS. 3A to 3C are diagrams showing an example of a displaceable member of the vehicular electronic key system according to the embodiment of the invention.

The displaceable member 61 exemplarily shown in FIG. 3A, for example, includes a U-shaped ring 71 as shown in FIG. 1. The ring 71 is accommodated inside the key body 31 in such a way as to be pushed by the mechanical key 32 in the attachment state of the mechanical key 32 into the key body 31 of the mechanical key 32, and is urged to project outside from the key body 31 by an urging member (not shown), such as a spring, provided in the key body 31 in the detachment state of the mechanical key 32 from the key body 31 of the mechanical key 32.

When the mechanical key 32 is attached to the key body 31, a movable part 61*b* including the ring 71 of the displaceable member 61 contacts the mechanical key 32 to be displaced and accommodated inside the key body 31. As a result, the switch is turned ON to output a signal.

Figure 3B:
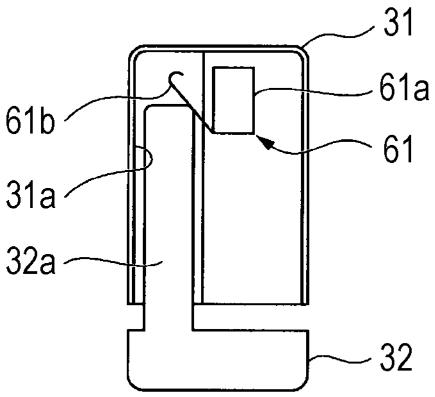

The displaceable member 61 exemplarily shown in FIG. 3B, for example, is a switch or the like provided in an insertion part 31*a* in which a key plate 32*a* of the mechanical key 32 is inserted inside the key body 31.

When the mechanical key 32 is attached to the key body 31, the movable part 61*b* contacts the key plate 32*a* of the mechanical key 32 to be displaced. As a result, the switch is turned ON to output a signal.

Figure 3C:
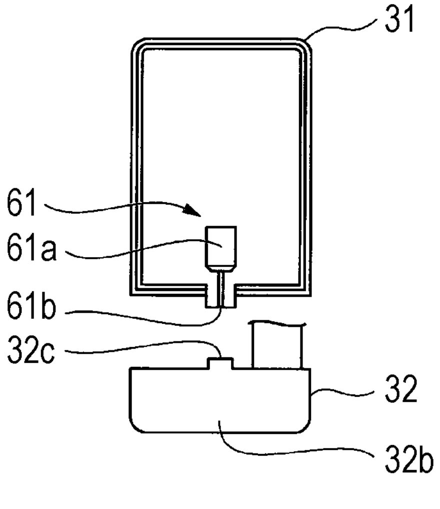

The displaceable member 61 exemplarily shown in FIG. 3C, for example, is a switch or the like provided at a position where the key body 31 and the mechanical key 32 contact each other with the mechanical key 32 attached to the key body 31 of the mechanical key 32.

When the mechanical key 32 is attached to the key body 31, the movable part 61*b* contacts a predetermined position of the mechanical key 32 (e.g., a projection 32*c* or the like provided on a key head 32*b* shown in FIG. 3C) to be displaced, so that the switch is turned ON to output a signal.

Figure 4:
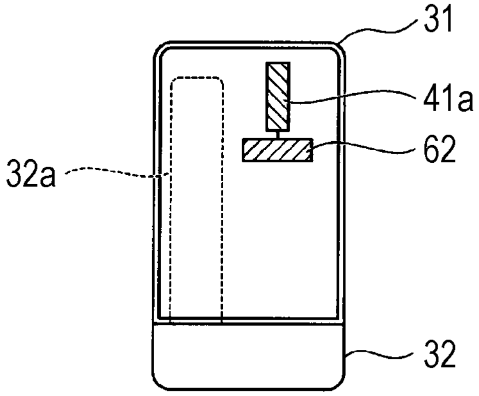
FIG. 4 is a diagram showing an example of a sensor of the vehicular electronic key system according to the embodiment of the invention.

The sensor 62 exemplarily shown in FIG. 4, for example, detects an electromagnetic change according to the attachment or detachment of the mechanical key 32 to or from the key body 31 of the mechanical key 32. For example, the sensor 62 detects the impedance of an LF antenna 41*a* having directivity in the direction of extension of the key plate 32*a* in the attachment state of the mechanical key 32 to the key body 31 of the mechanical key 32, and outputs a signal representing the detection result.

This sensor 62 is designed based on the phenomenon that as the key plate 32*a* approaches the LF antenna 41*a*, the inductance changes, and the impedance changes according to the change in inductance. Specifically, the value of the current flowing through the LF antenna 41*a* is detected when a voltage is applied to the LF antenna 41*a*, a change in the current value is converted to a voltage, and a change in impedance is detected from the converted voltage and a change in the voltage applied to the LF antenna 41*a*.

The timing at which a voltage is applied to the LF antenna 41*a* in the sensor 62 can be set to be, for example, normally-on, or every predetermined period, or a point of time at which the RF signal is transmitted to the vehicle 11 under the control of the portable-unit controller 44 according to a predetermined operation performed on the portable unit 12, and is adequately set according to the power consumed by application of a voltage to the LF antenna 41*a*. Note that this power consumption becomes smaller in the order of the timings named above.

The release button 63 is operated to disengage an engagement part 32*d* of the mechanical key 32 engaged with the key body 31 when the mechanical key 32 is attached to the key body 31. The release button 63 outputs a signal at each of the timing at which the engagement of the engagement part 32*d* is released by, for example, the depressing operation of the operator, and the timing at which the mechanical key 32 is attached to the key body 31 to set the engagement state of the engagement part 32*d*.

Next, an operational example of the vehicular electronic key system 10 according to the embodiment which has the foregoing structure will be described.

First, when the mechanical key 32 is detached from the key body 31, the key detector 47 detects the detachment state of the mechanical key 32 from the key body 31. Then, the portable-unit controller 44 changes the control mode to the valet mode.

When the operator operates the trunk unlock button 46*a* of the limited-function operation switch 46 in this situation, for example, transmission of a limited-function command signal to the vehicle 11 from the radio communication unit 41 of the key body 31 is inhibited.

When the operator carrying the key body 31 touches the handle to release the trunk of the vehicle 11 with the control mode changed to the valet mode, for example, a request signal including a signal indicating the direct contact of the operator with the handle of the trunk is transmitted to the portable unit 12 from the vehicle 11.

Then, transmission of a response signal to the vehicle 11 from the portable unit 12 in response to the request signal is inhibited. Then, a predetermined function of the vehicle 11 associated with the direct contact of the operator, i.e., unlocking of the trunk achieved by driving of the trunk lock unit 27 or a part of predetermined functions of the vehicle 11 which is inhibited by the valet mode, is inhibited on the vehicle 11 which cannot receive the response signal to the request signal.

When the operator operates the switch which instructs control of unlocking of the vehicle's doors and trunk of the vehicle 11 with the control mode changed to the valet mode, a request signal including a signal instructing control of unlocking of the vehicle's doors and trunk is transmitted toward the portable unit 12 from the vehicle 11.

Then, a signal indicating transmission of the control mode from the normal mode to the valet mode is transmitted, together with the response signal, to the vehicle 11 from the portable unit 12 in response to the request signal. Then, only some of predetermined functions of the vehicle 11 which has received those signals, i.e., unlocking of the trunk achieved by driving of the trunk lock unit 27 is inhibited, and unlocking of the vehicle's doors achieved by driving of the door lock unit 26 is permitted.

As described above, the vehicular electronic key system 10 according to the embodiment of the invention can permit the control mode to be changed to the valet mode only through a part of the operation that is normally needed for the transition of the mode of the vehicular electronic key system 10 to the valet mode, i.e., only an operation of detaching the mechanical key 32 from the key body 31, and can permit the owner to carry the mechanical key 32 around. This can improve the convenience without impairing the operability and increasing the number of components.

Further, while the mechanical key 32 is detached from the key body 31, transmission of a limited-function command signal which is triggered by the operation of the limited-function operation switch 46 for instructing execution of releasing of the limitation of the functions limited in the valet mode is inhibited, thus preventing the limited-function command signal from being transmitted to the vehicle 11 unnecessarily and preventing power consumption of the portable unit 12 from being wasted.

Further, inhibition and permission of the transition to the valet mode can be switched only in the attachment state where the mechanical key 32 is attached to the key body 31, so that inhibition of the transition to the valet mode in the detachment state where the mechanical key 32 is detached from the key body 31 can be arbitrarily set while securing desired safety, thus further improving the convenience.

Moreover, as the attachment state and the detachment state of the mechanical key 32 to and from the key body 31 are detected through communication of the key body 31 with the transponder 51 normally provided in the mechanical key 32 in case of emergency, such as the battery of the portable unit 12 being dead, the valet mode is prevented from being released by attachment of an object other than the normal mechanical key 32. This makes it possible to secure desired safety while sharing components.

Furthermore, power needed for communication with the transponder 51 of the mechanical key 32 is supplied to the transponder 51 from the key body 31 according to the timing at which the attachment or detachment of the mechanical key 32 to or from the key body 31 is detected, thus preventing power consumption of the portable unit 12 from being wasted.

According to the embodiment, the limited-function operation switch 46 of the key body 31 may be omitted. In this case, as described above, some of predetermined functions of the vehicle 11 (e.g., unlocking the trunk achieved by driving of the trunk lock unit 27) according to the operator's operation performed on the member provided on the vehicle 11 and corresponding to the limited-function operation switch 46 (e.g., the handle for releasing the trunk of the vehicle 11) should be limited in the valet mode.

Although one of predetermined functions which are limited in the valet mode is set to be unlocking of the trunk achieved by driving of the trunk lock unit 27 in the foregoing embodiment, the invention is not limited to this particular case, and another function may be added. For example, some of predetermined functions may include unlocking of the glove compartment of the vehicle 11 which is achieved by driving of a glove-compartment lock unit that switches between unlocking and locking of the glove compartment. In this case, a glove-compartment unlock button to instruct unlocking of the glove compartment by driving the glove-compartment lock unit may be provided as the limited-function operation switch 46 of the key body 31.

According to the embodiment of the invention, a vehicular electronic key system includes a vehicle (e.g., vehicle 11 according to an exemplary embodiment) having a key cylinder (e.g., key cylinder 11*a* according to the exemplary embodiment), and a portable unit (e.g., portable unit 12 according to the exemplary embodiment) having a key body (e.g., key body 31 according to the exemplary embodiment) communicatable with the vehicle, and a mechanical key (e.g., mechanical key 32 according to the exemplary embodiment) attachable to and detachable from the key body and mechanically rotating the key cylinder whereby the communication between the vehicle and the portable unit allows the vehicle to execute predetermined functions, the key body including a key detection unit (e.g., key detector 47 according to the exemplary embodiment) which detects an attachment state and a detachment state of the mechanical key to and from the key body so that the key body transitions to a valet mode to limit some of the predetermined functions executable by the vehicle in accordance with the communication between the vehicle and the portable unit while the key detection unit detects the detachment state of the mechanical key from the key body.

According to the vehicular electronic key system of the above mentioned embodiment of the invention, transition to the valet mode is enabled by only part of an operation which is normally needed to change the vehicular electronic key system to the valet mode, i.e., only an operation of separating the mechanical key from the key body, and the owner can carry the mechanical key, so that the convenience is improved without impairing the operability and increasing the number of the components of the electronic key.

According to the embodiment of the invention, the portable unit may include a limited-function operation member (e.g., limited-function operation switch 46 according to an exemplary embodiment) which is operated to transmit a limited-function command signal instructing execution of a function limited by the valet mode to the vehicle, and may inhibit transmission of the limited-function command signal triggered by operation of the limited-function operation member while the key detection unit detects the detachment state of the mechanical key from the key body.

The vehicular electronic key system of the above mentioned embodiment of the invention prevents the limited-function command signal from being unnecessarily transmitted to the vehicle, preventing power consumption of the portable unit from being wasted.

According to the embodiment of the invention, the portable unit may include an operation member (e.g., operation switch 45 according to an exemplary embodiment) which is operated to transmit a command signal instructing execution of one of the predetermined functions to the vehicle, whereby when the operation member is operated in a predetermined operation pattern different from the operation to transmit the command signal to the vehicle while the attachment state of the mechanical key from the key body is detected by the key detection unit, the portable unit inhibits transition to the valet mode thereafter.

The vehicular electronic key system of the above mentioned embodiment of the invention can switch between inhibition and permission of transition to the valet mode only in the attachment state where the mechanical key is attached to the key body. It is therefore possible to arbitrarily set inhibition of transition to the valet mode in the detachment state where the mechanical key is separated from the key body while securing desirable safety, further improving the convenience.

According to the embodiment of the invention, the mechanical key may include a transponder (e.g., transponder 51 according to an exemplary embodiment) which is supplied with power from the vehicle to send a unique signal, the vehicle may include a vehicle-side transponder communication unit (e.g., transponder communication unit 22 according to the exemplary embodiment) which supplies power to the transponder of the mechanical key to carry out communication therewith, and an engine start unit (e.g., vehicle controller 24 according to the exemplary embodiment) capable of starting an engine of the vehicle through the communication of the vehicle-side transponder communication unit with the transponder, and the key body may include a key-side transponder communication unit (e.g., transponder communication unit 42 according to the exemplary embodiment) which communicates with the transponder and outputs a communication result with the mechanical key attached to the key body, whereby the key detection unit detects the attachment state and the detachment state of the mechanical key to and from the key body based on the communication result output from the key-side transponder communication unit.

The vehicular electronic key system of the above mentioned embodiment of the invention can prevent the valet mode from being released by attachment of an object other than the normal mechanical key by detecting the attachment state and the detachment state of the mechanical key to and from the key body through communication between the transponder generally provided in the mechanical key for emergency use, such as the battery of the portable unit being dead, and the key body. This makes it possible to secure desirable safety while sharing components.

According to the embodiment of the invention, the key body may include a displaceable member (e.g., displaceable member 61 according to an exemplary embodiment) which is displaced when in contact with the mechanical key in accordance with the attachment or detachment of the mechanical key to or from the key body, and the key-side transponder communication unit may communicate with the transponder in accordance with displacement of the displaceable member.

According to the vehicular electronic key system of the above mentioned embodiment of the invention, power needed for communication of the transponder is supplied to the key-side transponder communication unit from the key body only at the timing at which attachment or detachment of the mechanical key to or from the key body is detected, thus preventing power consumption of the portable unit from being wasted.

According to the embodiment of the invention, the key body may include a detection unit (e.g., sensor 62 according to an exemplary embodiment) which detects an electromagnetic change corresponding to attachment or detachment of the mechanical key to or from the key body, and the key-side transponder communication unit may communicate with the transponder when the detection unit detects the electromagnetic change.

According to the vehicular electronic key system of the above mentioned embodiment of the invention, power needed for communication of the transponder is supplied to the key-side transponder communication unit from the key body only at the timing at which attachment or detachment of the mechanical key to or from the key body is detected, thus preventing power consumption of the portable unit from being wasted.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicular electronic key system comprising:

a vehicle having a key cylinder; and a portable device comprising:

a key body that is communicatable with the vehicle;

a mechanical key that is attachable to and detachable from the key body and that mechanically rotates the key cylinder whereby the communication between the vehicle and the Portable device allows the vehicle to execute predetermined functions; and the key body including a key detector configured to detect an attachment state and a detachment state of the mechanical key to and from the key body so that the key body transitions to a valet mode to limit some of the predetermined functions executable by the vehicle in accordance with the communication between the vehicle and the portable device while the key detector detects the detachment state of the mechanical key from the key body, wherein the portable device includes an operation member which is operated to transmit a command signal instructing execution of one of the predetermined functions to the vehicle, whereby when the operation member is operated in a predetermined operation pattern different from the operation to transmit the command signal to the vehicle while the attachment state of the mechanical key to the key body is detected by the key detector, the portable device inhibits transition to the valet mode thereafter.

2. A vehicular electronic key system comprising:

a vehicle having a key cylinder; and a portable device comprising:

a key body that is communicatable with the vehicle;

a mechanical key that is attachable to and detachable from the key body and that mechanically rotates the key cylinder whereby the communication between the vehicle and the portable device allows the vehicle to execute predetermined functions; and the key body including a key detector configured to detect an attachment state and a detachment state of the mechanical key to and from the key body so that the key body transitions to a valet mode to limit some of the predetermined functions executable by the vehicle in accordance with the communication between the vehicle and the portable device while the key detector detects the detachment state of the mechanical key from the key body, wherein the mechanical key includes a transponder which is supplied with power from the vehicle to send a unique signal, the vehicle includes a vehicle-side transponder communication device which supplies power to the transponder of the mechanical key to carry out communication with the vehicle-side transponder communication device, and an engine start device capable of starting an engine of the vehicle through the communication of the vehicle-side transponder communication device with the transponder, and the key body includes a key-side transponder communication device which communicates with the transponder and outputs a communication result with the mechanical key attached to the key body, whereby the key detector detects the attachment state and the detachment state of the mechanical key to and from the key body based on the communication result output from the key-side transponder communication device.

3. The vehicular electronic key system according to claim 2, wherein the key body includes a displaceable member which is displaced when in contact with the mechanical key in accordance with the attachment or detachment of the mechanical key to or from the key body, and the key-side transponder communication device communicates with the transponder in accordance with displacement of the displaceable member.

4. The vehicular electronic key system according to claim 2, wherein the key body includes a detector which detects an electromagnetic change corresponding to attachment or detachment of the mechanical key to or from the key body, and the key-side transponder communication device communicates with the transponder when the detector detects the electromagnetic change.

* * * * *